(12) United States Patent
Jiang et al.

(10) Patent No.: US 9,111,333 B2
(45) Date of Patent: Aug. 18, 2015

(54) PREDICTIVE POSITION ENCODING

(75) Inventors: Wenfei Jiang, Beijing (CN); Kangying Cai, Beijing (CN); Teng Ma, Beijing (CN)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 14/356,233

(22) PCT Filed: Nov. 7, 2011

(86) PCT No.: PCT/CN2011/081880
§ 371 (c)(1),
(2), (4) Date: Aug. 1, 2014

(87) PCT Pub. No.: WO2013/067674
PCT Pub. Date: May 16, 2013

(65) Prior Publication Data
US 2014/0376827 A1    Dec. 25, 2014

(51) Int. Cl.
*G06T 9/00* (2006.01)
*G06T 17/00* (2006.01)
(Continued)

(52) U.S. Cl.
CPC .............. *G06T 9/001* (2013.01); *G06T 9/005* (2013.01); *G06T 9/40* (2013.01); *G06T 17/005* (2013.01); *G06T 17/205* (2013.01); *G06T 2207/20021* (2013.01)

(58) Field of Classification Search
CPC ........... G06T 9/001; G06T 9/005; G06T 9/40; G06T 17/00; G06T 17/005; G06T 17/20; G06T 17/205; G06T 2207/20021
See application file for complete search history.

(56) References Cited

U.S. PATENT DOCUMENTS 5,825,369 A * 10/1998 Rossignac et al. ............ 345/440
5,886,702 A *  3/1999 Migdal et al. ................. 345/423
(Continued)

FOREIGN PATENT DOCUMENTS

WO    WO2009128617    10/2009

OTHER PUBLICATIONS

Huang et al., "A Generic Scheme for Progressive Point Cloud Coding", IEEE Transactions on Visualization and Computer Graphics, vol. 14, No. 2, Mar./Apr. 2008, pp. 440-453.
(Continued)

*Primary Examiner* — Manav Seth
(74) *Attorney, Agent, or Firm* — Robert D. Shedd; Chris Kolefas

(57) ABSTRACT

A method and apparatus for position coding of three dimensional mesh models are described including estimating a symbol probability of a non-empty-child-cell $C_{l,k}$, where $Q_{l,k}$ denotes the $k^{th}$ cell at layer l, wherein the symbol probability is estimated based on an accuracy of a fitted plane P, subdividing the non-empty-child-cell to produce a sub-cell, if the non-empty-child-cell has more than one vertex, determining if there are more unprocessed non-empty-child-cells at layer l, if there are no more unprocessed non-empty-child-cells at layer l, determining if all non-empty-child-cells at layer l have only one vertex and a distance between the center of the sub-cell and a point inside the sub-cell is less than or equal to a first threshold and entropy coding symbols representing a position of the non-empty-child-cells, if all non-empty-child-cells at layer l have only one vertex and the distance between the center of the sub-cell and the point inside the sub-cell is less than or equal to the first threshold.

22 Claims, 10 Drawing Sheets

(51) Int. Cl.
*G06T 17/20* (2006.01)
*G06T 9/40* (2006.01)

(56) References Cited

U.S. PATENT DOCUMENTS

| | | | | |
|---|---|---|---|---|
| 5,905,507 | A * | 5/1999 | Rossignac et al. | 345/440 |
| 5,923,777 | A * | 7/1999 | Chun et al. | 382/173 |
| 5,933,153 | A * | 8/1999 | Deering et al. | 345/501 |
| 5,966,469 | A | 10/1999 | Moon et al. | |
| 6,009,435 | A * | 12/1999 | Taubin et al. | 345/555 |
| 6,031,548 | A * | 2/2000 | Gueziec et al. | 345/440 |
| 6,167,159 | A * | 12/2000 | Touma et al. | 382/242 |
| 6,184,897 | B1 * | 2/2001 | Gueziec et al. | 345/440 |
| 6,262,737 | B1 * | 7/2001 | Li et al. | 345/419 |
| 6,392,647 | B1 * | 5/2002 | Migdal et al. | 345/423 |
| 6,459,429 | B1 * | 10/2002 | Deering | 345/423 |
| 6,563,500 | B1 * | 5/2003 | Kim et al. | 345/423 |
| 6,577,310 | B1 * | 6/2003 | Kim et al. | 345/427 |
| 6,614,428 | B1 * | 9/2003 | Lengyel | 345/420 |
| 6,668,091 | B1 * | 12/2003 | Kim et al. | 382/243 |
| 6,868,420 | B2 * | 3/2005 | Perry et al. | 707/743 |
| 6,947,879 | B2 * | 9/2005 | Yamada et al. | 703/2 |
| 7,224,729 | B1 * | 5/2007 | Jang et al. | 375/240.08 |
| 8,884,953 | B2 * | 11/2014 | Chen et al. | 345/420 |
| 2009/0202160 | A1 * | 8/2009 | Kim et al. | 382/233 |

OTHER PUBLICATIONS

Devillers et al., "Geometric Compression for Interactive Transmission", INRIA, 2004.
Peng et al., Geometry-guided Progressive Lossless 3D Mesh Coding with Octree (OT) Decomposition, Association for Computing Machinery, Inc., 2005.
Search Report.

* cited by examiner

Traversal Order

| First Division | Second Division | | Third Division | |
|---|---|---|---|---|
| 1111 | 0010 | 1111 | - - 0010 0001 | |
|  | 0100 | 1101 | - 0010 1000 1010 | |
|  |  |  | - 0010 0010 1000 | |
|  |  |  | - - 1000 - | |

PREDICTIVE POSITION ENCODING

This application claims the benefit, under 35 U.S.C. §365 of International Application PCT/CN2011/081880 filed Nov. 7, 2011 which was published in accordance with PCT Article 21(2) on May 16, 2013 in English. Furthermore, this application is related to the International Application PCT/CN2011/081878, filed Nov. 7, 2011, which was published in accordance with PCT Article 21(2) on May 16, 2013 in English, which is incorporated by reference in its entireties.

FIELD OF THE INVENTION

The present invention relates to three dimensional (3D) models, and more particularly, to compressing and transmitting 3D mesh data models, as well as receiving and decoding compressed 3D data.

BACKGROUND OF THE INVENTION

Large 3D engineering models like architectural designs, chemical plants and mechanical computer-aided design (CAD) designs are increasingly being deployed in various virtual world applications, such as Second Life™ and Google Earth™. In most engineering models there are a large number of small to medium sized connected components, each having up to a few hundred polygons on average. Moreover, these types of models have a number of geometric features that are repeated in various positions, scales and orientations. Computer and video games use 3D models as does the motion picture (movie) industry. The movie industry uses 3D models as characters and objects in animated and real life motion pictures. 3D models are also used in medicine and architecture.

Various algorithms have been proposed to compress 3D meshes efficiently since the early 1990s. Early work, however, mostly concentrated on compressing single connected 3D models with smooth surfaces and small triangles. For multi-connected 3D models, such as large 3D engineering models, the components are compressed separately. This causes a relatively ineffective compression. In fact, the compression performance can be greatly increased by removing the redundancy between different connected components. Compression, in the motion picture industry, of 3D models is extremely important in the transmission of 3D motion pictures over broadband to consumers and transmission to theaters. 3D mesh models (e.g., movie, motion pictures) consume very large amount of bandwidth.

A method for automatically discovering repeating geometric features in large 3D engineering models was proposed in D. Shikare, S. Bhakar and S. P. Mudur, "Compression of Large 3D Engineering models Using Automatic Discovery of repeating geometric Features", $6^{th}$ International Fall Workshop on Vision, Modeling and Visualization (VMV2001), Nov. 21-23, 2001, Stuttgart, Germany (hereinafter "Shikare"). However, much room was left for more efficient compression of 3D engineering models. For example, no compression solution was provided that covered transformation information of repeated instances, which is necessary for restoring the original model. Considering the large size of connected components that a 3D engineering model usually has, this kind of information also consumes a large amount of storage. Further, if PCA (Principal Component Analysis) of positions of vertices of a component is used, components with the same geometry and different connectivity will have the same mean and same orientation axes. Thus, the state of the art is not suitable for detecting repeating patterns in various scales. Two components that differ only in scale (i.e. size) are not recognized as repeating features of the same equivalence class. Further, it is desirable to achieve a higher compression ratio than described in Shikare.

O. Devillers, P. Gandoin, "Geometric Compression for Interactive transmission", in IEEE Visualization, 2000, pp. 319-326 (hereinafter "Devillers") describes a KD-tree based compression algorithm to encode the means of all connected components of a mesh model. At each iteration, this algorithm subdivides a cell into two child cells, and encodes the number of vertices in one of the two child cells. If the parent cell contains p vertices, the number of vertices in one of the child cells can be encoded using $\log_2(p+1)$ bits with an arithmetic coder. This subdivision is recursively applied, until each non-empty cell is small enough to contain only one vertex and enables a sufficiently precise reconstruction of the vertex position. It is mentioned in Devillers that the algorithm is most efficient for non-uniform distributions, with regular distribution being the worst case.

A sequence of symbols, wherein the symbols are chosen from an alphabet or a symbol set, can be compressed by entropy coding. An entropy coding engine assigns codewords for symbols based on the statistical model, i.e., the probability distributions of symbols. In general, more frequently used symbols are entropy coded with fewer bits and less frequently occurring symbols are entropy coded with more bits.

Entropy coding has been studied for decades. Basically, there are three types of entropy coding methods: variable length coding (VLC), like Huffman coding, arithmetic coding, and dictionary-based compression, like Lempel-Ziv (LZ) compression or Lempel-Ziv-Welch (LZW) compression.

The VLC codes use an integral number of bits to represent each symbol. Huffman coding is the most widely used VLC method. It assigns fewer bits to a symbol with greater probability, while assigning more bits to a symbol with a smaller probability. Huffman coding is optimal when the probability of each symbol is an integer power of ½. Arithmetic coding can allocate a fractional number of bits to each symbol so that it can approach the entropy more closely. Huffman coding and arithmetic coding have been widely used in existing image (video) compression standards, e.g., JPEG, MPEG-2, H.264/AVC. The LZ or LZW utilize a table based compression model where table entries are substituted for repeated strings of data. For most LZ methods, the table is generated dynamically from earlier input data. The dictionary based algorithm has been employed in, for example, GIF, Zip, PNG standards.

Spatial tree based approaches can be used to compress geometry data, such as random point positions and vertex positions of watertight 3D models. A watertight 3D model is a model in which the vertices are evenly and densely distributed. Spatial tree based approaches organize input spatial points by an octree or a KD-tree. The tree is traversed and the information required for tree restoration is stored.

Initially, a bounding box is constructed around all points of a 3D model. The bounding box of all 3D points is regarded as a single cell in the beginning. To build the spatial tree, a cell is recursively subdivided until each non-empty cell is small enough to contain only one vertex and enable a sufficiently precise reconstruction of the vertex position. As vertex positions can be restored from central coordinates of corresponding cells, the spatial tree based algorithms may achieve multi-resolution compression with the same compression ratio as single-resolution compression algorithms.

FIG. 1 shows the principle of KD-tree coding in a 2D case. The 2D model is enclosed by a bounding box 10, which is called parent cell. Seven vertices are positioned within the parent cell. The KD-tree encoding algorithm starts with encoding the total number of vertices using a predefined number of bits, and then subdivides the cells recursively. Each time it subdivides a parent cell into two child cells, it encodes the number of vertices in one of the two child cells. By convention, this may be the left child cell (after vertical splitting) or the upper cell (after horizontal splitting). If the parent cell contains p vertices, the number of vertices in one of the child cells can be encoded using $\log_2(p+1)$ bits with an arithmetic coder. This subdivision is recursively applied, until each non-empty cell is small enough to contain only one vertex and enable a sufficiently precise reconstruction of the vertex position. For compressing the positions of all repeated instances, the entire bounding-box 10 of all the positions is regarded as a parent cell in the beginning. In the example of FIG. 1, the total number of vertices (seven) is encoded using 32 bits. Then vertical splitting is applied, so that a left child cell V1 and a right child cell V2 are obtained. In the next coding step, the number of vertices in the left child cell V1, which is four, is encoded. The number of bits used for the encoding is determined by the number of vertices within the parent cell: in this example, it is $\log_2(7+1)=3$ bits. From the number of vertices in the parent cell and the number of vertices in the left child cell V1, the number of vertices in the right child cell V2 can be deduced, and therefore needs not be encoded.

In the next step, horizontal splitting is applied. The left child cell V1, which is now a parent cell V1, is split into an upper child cell V1H1 and a lower child cell V1H2. The right child cell V2, which is now a parent cell V2, is split into an upper child cell V2H1 and a lower child cell V2H2. The encoding continues with the upper left child cell V1H1, which has two vertices. Thus, the number 2 is encoded next, wherein $\log_2(4+1)=2.3$ bits are used in an arithmetic coder. As described above, the number of vertices in the lower left child cell V1H2 needs not be encoded, since it can be deduced from the number of vertices in the left cell V1 and in the upper left child cell V1H1. Then, the same procedure is applied to the right cell V2, which results in encoding a zero using two bits. As shown in FIG. 1, two more splitting steps are necessary until each vertex is in a separate cell, and even more steps are necessary until each vertex is sufficiently localized within its cell. Each step requires the encoding of a growing number of ones or zeros. Depending on the required accuracy, the number of additional steps may be high.

On the other hand, an octree based approach subdivides, in each iteration, a non-empty cell into eight child cells. For ease of illustration, 2D examples describing a quadtree are shown in FIGS. 2 and 3. The traversal orders are denoted by arrows. For encoding, a current parent cell is split into four child cells that are traversed in a pre-defined order, and a single bit per child cell indicates whether or not there is a point within the child cell. For example, in FIG. 2, the child cells of two parent cells 1 and 2 are traversed as shown in arrows, with non-empty child cells being colored gray. Child cells 210, 211, 212, and 213 of the first parent cell 1 are represented by a first sequence '1010'. Since the first and third child cells 210, 212 of the traversal are non-empty (i.e., contain one or more points), they are indicated by '1's. The second and fourth child cells 211, 213 are empty (i.e. contain no points), they are indicated by '0's. FIG. 3 shows the same cells using different traversals and resulting sequences.

FIG. 4 shows parent and child cells of an octree scheme. In the octree scheme, a parent cell is split into eight child cells 40, . . . , 46 (one hidden child cell behind lower left cell 42 is not shown). A possible traversal order could be left-right, up-down and front-back, resulting in a traversal sequence of cells 40-41-42-43-44-45 (hidden cell behind lower left cell 42)-46. Correspondingly, in the octree case the non-empty child cell configuration is denoted by 8-bit binary numbers, covering all the 255 possible combinations of empty and non-empty child cells. Separate encoding of the number of non-empty child cells is not required. TABLE 1 is an example of a sequence.

TABLE 1

| An exemplary sequence. |
|---|
| 11111111 |
| 01100110 |
| 00111011 |
| 11001100 |
| 00010000 |
| 00000010 |
| 00000010 |
| 10000000 |
| 00000001 |

Note that the specific traversal order of child cells within a parent cell is not very relevant for the present embodiments. In principle, any traversal order can be used for the present embodiments. In the following, the string of bits used to represent a child cell configuration is denoted as a symbol. In the example of TABLE 1, 8 bits are used for each symbol. In other implementations, the number of bits in a symbol may vary. For example, a 4-bit string is used to represent the child cell configuration for a quadtree, and thus, the number of bits for a symbol in the example of FIG. 2 is 4.

FIG. 5 shows an example of an octree structure. Each node is associated with a symbol and each layer corresponds to a certain precision of the tree representation. The initial cell is divided into eight cells. Child cells 1, 2, 5, 6, and 7 contain more vertices and child cells 3, 4, and 8 are empty, resulting an 8-bit symbol 11001110 (510) to represent the child cell configuration at layer 0. Each non-empty child cells are further divided and the corresponding child cell configurations are represented in layer 1. The subdivision may continue until each non-empty cell only contains one vertex.

TABLE 2

| An exemplary probability distribution. | | | | | | | | | |
|---|---|---|---|---|---|---|---|---|---|
| Symbol | p | Symbol | p | Symbol | p | Symbol | p | Symbol | p |
| 00000100 | 0.1280 | 00000101 | 0.0034 | 10100000 | 0.0020 | 00001010 | $10^{-3}$ | 01000100 | $10^{-3}$ |
| 00000010 | 0.1275 | 00001001 | 0.0030 | 00000011 | 0.0015 | 00001011 | $10^{-3}$ | 01100010 | $10^{-3}$ |
| 00001000 | 0.1167 | 01100000 | 0.0025 | 00010001 | 0.0015 | 00001111 | $10^{-3}$ | 01101000 | $10^{-3}$ |
| 10000000 | 0.1162 | 10000010 | 0.0025 | 00010010 | 0.0015 | 00011000 | $10^{-3}$ | 10111011 | $10^{-3}$ |
| 01000000 | 0.1128 | 10001000 | 0.0025 | 00101000 | 0.0015 | 00011100 | $10^{-3}$ | 11001100 | $10^{-3}$ |
| 00010000 | 0.1118 | 00000110 | 0.0020 | 00110000 | 0.0015 | 00100110 | $10^{-3}$ | 11010000 | $10^{-3}$ |
| 00000001 | 0.1108 | 00001100 | 0.0020 | 01010000 | 0.0015 | 00111011 | $10^{-3}$ | 11111111 | $10^{-3}$ |
| 00100000 | 0.1098 | 00100010 | 0.0020 | 11000000 | 0.0015 | 01000010 | $10^{-3}$ | 00000111 | $5 \cdot 10^{-4}$ |

Using a breadth-first traversal of the octree, the vertex positions of a 3D mesh can be organized into a sequence of symbols. For the example in FIG. 5, the sequence of symbols becomes: 11001110, 11000000, 10010100, 00100110, 00001000, and 00001000.

The probability distribution of the most frequently occurring symbols in a complex 3D model is shown in TABLE 2, in a descending order of the probability. As can be seen from TABLE 2, the symbols having only one '1' in the binary representation occur with a dominant probability (>93%). The geometric explanation may be that the vertices seldom share a cell after several subdivisions. That is, the bottom layers of the octree are dominated by symbols with only one '1', and other symbols occur more often at the top layers.

According to the present embodiments, two symbol sets are defined: a universal symbol set, S0={1, 2, 3, ... , 255}, including all possible symbols, and a symbol set, S1={1, 2, 4, 8, 16, 32, 64, 128}, including only symbols having one '1', i.e., the most frequently occurring symbols. Note for ease of representation, 8-bits binary strings are written as decimal numbers. A symbol is called an S1 symbol if it belongs to symbol set S1, and is called a non-S1 symbol otherwise.

To benefit from the statistical property of an octree, PCT application No. PCT/CN2011/077279, entitled "A Model-Adaptive Entropy Coding Method for Octree Compression," proposes partitioning the sequence represented by an octree into several sub-sequences which are coded with S0 or S1 adaptively. The indices of sub-sequence boundaries are coded as supplemental information. Because of the overhead of the supplemental information (e.g., two bytes for each index), generally large sub-sequences of consecutive S1 symbols are coded with symbol set S1.

When S1 symbols and non-S1 symbols both occur in a portion of the sequence, with S1 symbols having much higher probabilities, it is not efficient to divide such a portion into several sub-sequences because of the overhead. On the other hand, it is also not efficient to code such a portion with symbol set S0 as non-S1 symbols occur with low probabilities.

In 3D mesh coding, the geometry data is usually compressed by spatial tree decomposition based approaches, e.g. KD-tree based approach described in Devillers or octree based approach described in J. L. Peng, C. C. Jay Kuo, "Geometry Guided Progressive Lossless 3D Mesh Coding with Octree Decomposition", ACM SIGGRAPH (ACM Transactions on Graphics 24 (3)), pp 609-616, 2005 (hereinafter "Peng") and Y. Huang, J. Peng, C. C. J. Kuo, and M. Gopi, "A Generic Scheme for Progressive Point Cloud Coding", IEEE Transactions on Visualization and Computer Graphics 14, pp 440-453, 2008 (hereinafter "Huang"). Besides supporting progressive coding, the methods of Devillers, Peng and Huang also achieve a considerable compression gain. These coders recursively subdivide the smallest axis-aligned bounding box of given 3D model into two or eight children in a KD-tree or octree, respectively, data structures. A cell is recursively subdivided until each nonempty cell is small enough to contain only one vertex and enable a sufficiently precise reconstruction of the vertex position. For each cell subdivision, whether or not each child cell is empty is signified by some symbols. A symbol sequence describing the KD-tree or octree, which are called traversal symbol sequences herein are generated by breadth first traversing the octree and collecting the symbols representing the subdivision of the nodes encountered. Then an entropy coder-decoder (codec) is utilized to compress that symbol sequence.

To reduce the entropy of the symbol sequence and then improve the coding efficiency, both Peng and Huang perform child-cell reordering based on some neighborhood-based predictor.

For each cell subdivision, Peng encodes the number, T ($1<=T<=8$), of non-empty-child cells and the index of its non-empty-child cell configuration among all possible combinations. The geometry information is taken into consideration during the non-empty-child cell representation, resulting in better compression but greater complexity.

PCT/CN2011/077279 and PCT/CN2011/078936 propose discarding the number of non-empty-child cells T. In such cases, the non-empty-child-cell configuration is denoted by 8-bit binary numbers, covering all 255 combinations. These 8-bit binary numbers are compressed by entropy coding.

The statistic based approaches proposed in PCT/CN2011/077279 and PCT/CN2011/078936 lead to much lower computational complexity and better robustness in randomly-distributed position coding than Devillers and Peng. The reverse is the case for the vertex compression of watertight 3D models. The reason is that the PCT/CN2011/077279 and PCT/CN2011/078936 do not remove the geometry redundancy, which costs considerable in terms of bits.

SUMMARY OF THE INVENTION

The present invention implements probability prediction for the position coding. Statistical coding cannot effectively remove the redundancy in the vertex positions of watertight 3D models. The present invention utilizes the geometry feature during the position coding. When building the octree for a 3D model, the probability of the non-empty-child-cell configuration is predicted for every particular cell based on the smoothness of the surfaces of 3D models. An entropy codec assigns a short codeword for the code-value (such as 0100) that occurs frequently and vice versa. For example, if the probability of 0100 is 50%, it is assigned a short code-word (about $-\log 2(0.5)=1$ bit). If the probability of 0110 is 12.5%, it is assigned a long code-word (about $-\log 2(0.125)=3$ bits). Thus, if the incoming code-value is predicted as a high-probability symbol, the corresponding codeword is usually short. Since the probability is based on the geometric correlation, the geometric redundancy is actually removed. In this way, the spatial redundancy can be efficiently removed and greater compression can be achieved.

A method and apparatus for position coding of three dimensional mesh models are described including estimating a symbol probability of a non-empty-child-cell $C_{l,k}$, where $C_{l,k}$ denotes the $k^{th}$ cell at layer l, wherein the symbol probability is estimated based on an accuracy of a fitted plane P, sub-dividing the non-empty-child-cell to produce a sub-cell, if the non-empty-child-cell has more than one vertex, determining if there are more unprocessed non-empty-child-cells at layer l, if there are no more unprocessed non-empty-child-cells at layer l, determining if all non-empty-child-cells at layer l have only one vertex and a distance between the center of the sub-cell and a point inside the sub-cell is less than or equal to a first threshold and entropy coding symbols representing a position of the non-empty-child-cells, if all non-empty-child-cells at layer l have only one vertex and the distance between the center of the sub-cell and the point inside the sub-cell is less than or equal to the first threshold.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
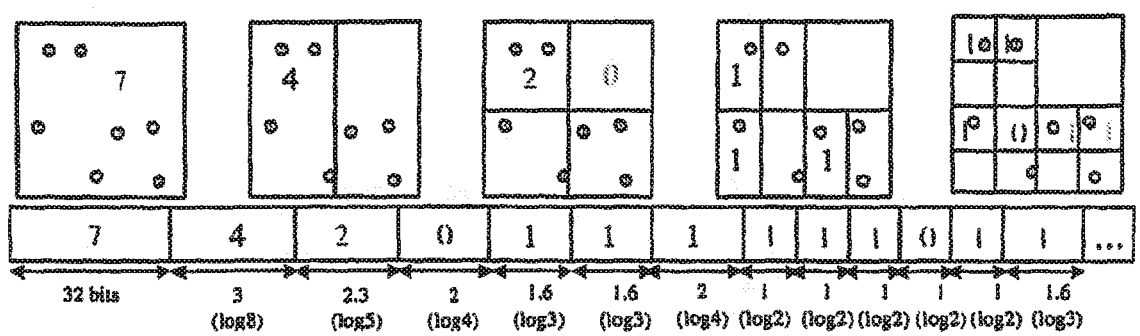
FIG. 1 is a pictorial representation of KD-tree based geometry coding for a two dimensional (2D) case.
Figure 6A:
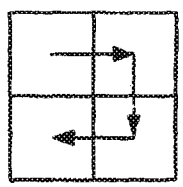
FIG. 6A shows the traversal order used for the exemplary quadtree construction.
Figure 2:
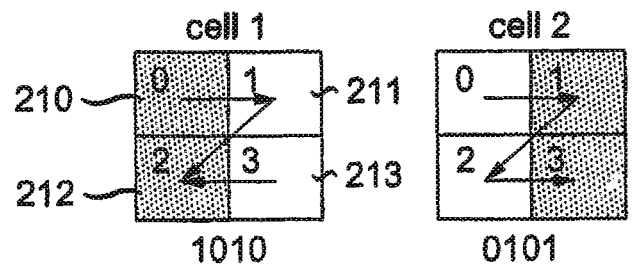
FIG. 2 is a pictorial representation of quadtree based geometry coding in a 2D case.
Figure 3:
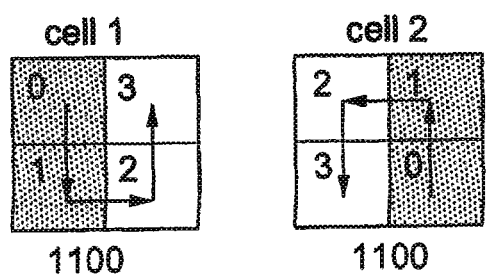
FIG. 3 is a pictorial representation of quadtree based geometry coding in a 2D case.
Figure 4:
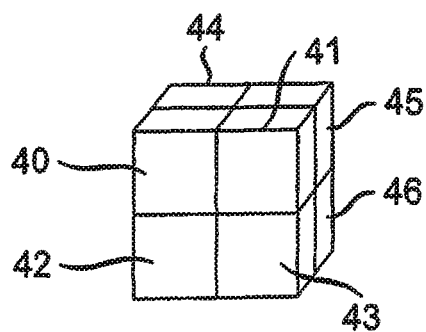
FIG. 4 is a pictorial representation of cell partitioning.
Figure 5:
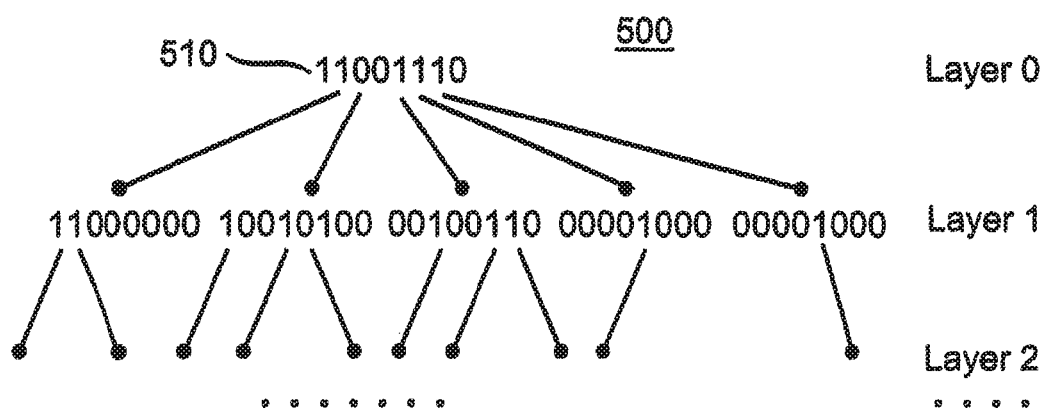
FIG. 5 is a pictorial representation of an exemplary octree.
Figure 6B:
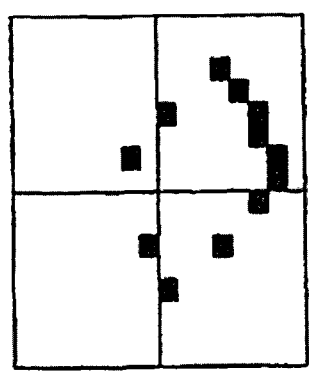
FIG. 6B shows the hierarchical division of the 2D space for the exemplary quadtree construction.
Figure 6B:
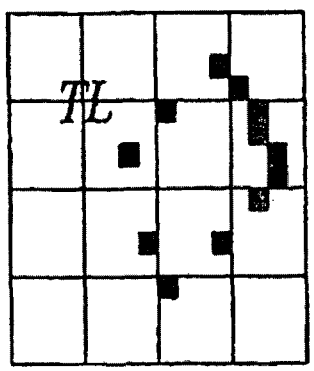
Figure 6B:
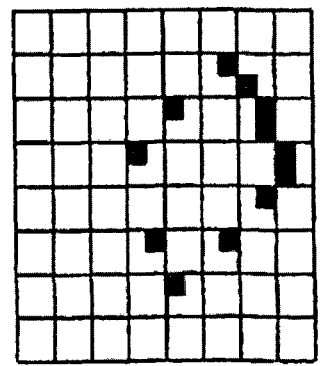
Figure 6C:
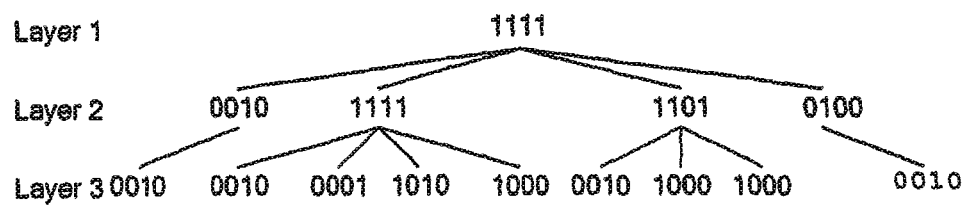
FIG. 6C shows the quadtree symbols resulting from the hierarchical 2D division of FIG. 6B for the exemplary quadtree construction.

For illustrational purposes, the process of building a quadtree is shown in FIGS. 6A-6C. FIG. 6A shows the traversal order used for the exemplary quadtree construction. FIG. 6B shows the hierarchical division of the 2D space for the exemplary quadtree construction. The small black squares denote the points to be coded. At the leftmost quadtree of FIG. 6B, divide the plane into 4 sub-cells of equal size. Since each sub-cell contains at least one point, the corresponding non-empty-child-cell configuration is 1111. At the middle quadtree of FIG. 6B, further divide each sub-cell into 4 sub-cells and encode the non-empty-child-cell configuration, e.g., only the bottom-right child cell of the sub-cell "TL" in FIG. 6B contains a point. Thus, the corresponding non-empty-child-cell configuration is 0010. Continuing to the rightmost quadtree of FIG. 6B, the cells are iteratively subdivided and the non-empty-child-cell configuration is encoded. FIG. 6C shows the quadtree symbols resulting from the hierarchical 2D division of FIG. 6B for the exemplary quadtree construction. The quadtree is constructed as shown in FIG. 6C; each layer corresponds to one subdivision iteration.

The present invention efficiently compresses the positions of regularly-distributed vertices. The present invention has four key points:
1. The symbol probability of non-empty-child-cell configuration is calculated with the distance between the center of each child-cell and the plane obtained by fitting the center points of neighboring cells.
2. The symbol probability of non-empty-child-cell configuration is calculated with the distance measure which is the value of the surface area of the convex hull formed by the center point of some child-cell and the center points of neighboring cells.
3. To fit a plane for a cell, if the connectivity information is available, the codec uses the center points of the cells in which at least one vertex is connected with one of the vertices in the current cell.
4. To fit a plane for a cell, if the connectivity information is unavailable, the codec uses the center points of the adjacent cells which contain at least one vertex.
5. The predicted probability is adjusted based on the accuracy of the fitting plane. For example, if the fitting error is small, the probability is set exactly as the predicted value. Otherwise, the probability is set closer to uniform distribution. A threshold value for the fitting error may be set as a configuration parameter. If a threshold value is set, then the threshold value is used to determine if the fitting error is large or small and thus, if the symbol probability is adjusted.

Figure 7A:
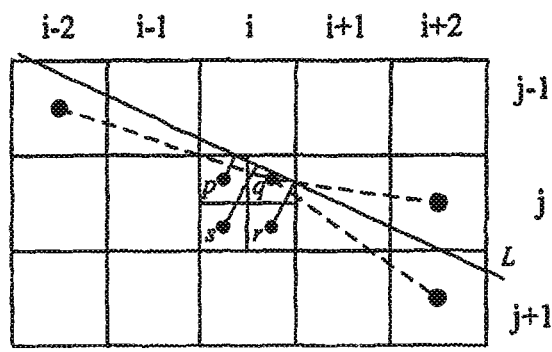
FIG. 7A shows an example of 2D position prediction if connectivity information is available.
Figure 7B:
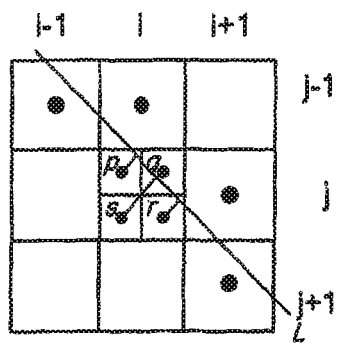
FIG. 7B shows an example of 2D position prediction if connectivity information is not available.

For the ease of illustration, the position prediction method of the present invention is explained using a 2D example. The plane fitting becomes line fitting in the 2D case. FIGS. 7A and 7B depict an exemplary vertex distribution in the 2D space. FIG. 7A shows an example of 2D position prediction if connectivity information is available. FIG. 7B shows an example of 2D position prediction if connectivity information is not available.

A:

With known connectivity information, the neighboring cells may be obtained in a straightforward way. The closer a child cell is to the fitting plane, the more probable that it is nonempty. From this measure, one observation is that the closer a child is to the fitting plane, the smaller the surface area of the convex hull which is formed by current child cell's center point and all neighboring cells' center points. This convex hull can be computed by a standard algorithm (such as Graham scan) with O(n log n) complexity. Once this hull is obtained, with preliminary geometry method, the surface area can be calculated easily. For the child-cell p, q, r and s, this area measure is denoted by disk where k=p, q, r, s.

$$\text{dist}_k = \text{area}(\text{ConvexHull}(k, \text{NeighboringCells})) \quad (1a)$$

B:

In FIG. 7A, the connectivity information is available. Given the connectivity of vertices, the connectivity of sub-cells at each layer can be calculated. As shown in FIG. 7A, the vertex lies in the child-cell q of the cell C(i, j), i.e., the quadtree symbol is 0100 using the traversal order of FIG. 6A. It is known that the cell C(i, j) is connected with the cells C(i−2, j−1), C(i+2, j), C(i+2, j+1). A cell set $S_C$ is defined which contains these cells. A line is fit to the points in cell set $S_C$ based on the central coordinates of the cells in $S_C$, obtaining line L. The function describing the line can be denoted by ax+by+c=0.

In FIG. 7B, the connectivity information is unavailable. As shown in FIG. 7B, the vertex lies in the child-cell q of the cell C(i, j), i.e., the quadtree symbol is again 0100 using the traversal order of FIG. 6A. The curved line denotes the real edge. It is known that there exist vertices in the cells C(i−1, j−1), C(i, j−1), C(i+1, j), C(i+1, j+1) and C(i, j). These cells are included in cell set $S_C$, and a line is fit based on the central coordinates of the points in cell set $S_C$, obtaining line L. The function describing the line can be denoted by ax+by+c=0.

Previously proposed methods assigned equal probability to the non-empty-child-cell configuration symbols (0001, 0010, 0100, 1000). The present invention assigns unequal probability adaptively based on the distances between the fitted line and the central points of the child-cell p, q, r and s. Denote the central points of the child-cells by $c_k(x_k, y_k)$ and their distances to the fitted line by $dist_k$ k=p, q, r, s, $$dist_k = (ax_k + by_k + c)/size \cdot \sqrt{a^2 + b^2}{2(k=p,q,r,s)} \quad (1b)$$

where size is the width of the cell to be divided.

Based on the values of $dist_k$ obtained by (1a) or (1b), the probability is calculated as:

$$weight_k = \exp - dist_k^2 / u \quad (2)$$

$$prob_k = \frac{1}{n}\sum_{k=1}^{n} weight_k \quad (3)$$

$prob_k$ is the probability that the vertex lies in the child-cell k and u is a parameter which will be discussed below.

As can be seen in FIGS. 7A and 7B, the distance between the line L and the central coordinate of the child-cell q is the smallest among all the child-cells, the probability of the symbol 0100 is set to a largest value. Consequently, the bit cost of the symbol for this subdivision (0100) is reduced.

Note that the non-empty-child-cell configuration symbols are not only 0001, 0010, 0100 and 1000. Cell configuration symbols 001, 0010, 0100 and 1000 account for only one vertex in the non-empty child cell. What is the probability for the cases that the cell contains multiple vertices? Take the symbol 0111 for example, which means there are three vertices in the child-cells q, r and s respectively. Denote the weight for such case by $weight_{qrs}$, $$1/weight_{qrs} = 1/weight_q + 1/weight_r + 1/weight_s \quad (4)$$

Such cases rarely occur and the $weight_{qrs}$ is still too large, so the weights are resealed. The codec estimates the probabilities of single-vertex symbols (0001, 0010, 0100 and 1000) and multiple-vertex symbols in the current layer. The weight for each symbol is multiplied by the corresponding probability estimated. Finally, the probability for each symbol is obtained by normalizing the corresponding weight, as in Eq. (2).

To check the fitting accuracy, the distances between the fitted line L and the central points of the cells in $S_C$ are calculated. Suppose the cells in $S_C$ are $c_k(x_k, y_k)$. k=1~n, $$dist_k = |ax_k + by_k + c|/\sqrt{a^2 + b^2} \quad (5)$$

$$u = \sum_{k=1}^{n} dist_k^2 \quad (6)$$

u indicates the fitting accuracy. A larger value of u indicates a smaller fitting error. The probability calculated by Eq. (3) is more reliable. A smaller value of u indicates a larger fitting error. Thus, the probability calculated by Eq. (3) is less reliable. When the value of u is taken into Eq. (2), the probability function gets closer to the uniform distribution as u increases. A threshold value for the fitting error may be set as a configuration parameter. If a threshold value is set, then the threshold value is used to determine if the fitting error is large or small and thus, if the symbol probability is adjusted.

In 3D plane fitting is used for predictive position coding of the present invention instead of the line fitting illustrated above. To represent 3D positions of vertices, the codec builds an octree to denote the occupancy of sub-cells. For each subdivision a plane is fit with the neighboring vertices of the child-cell with the vertex of interest. In 3D cases, the point position (vertex of interest) is denoted in the form of c(i, j, k), and the function for the fitted plane is in the form of ax+by+cz+w=0. Next the accuracy if the fitted plane is checked, obtaining the parameter u. Eq. (5) is extended to $$dist_k = |ax_k + by_k + cz_k + w|/\sqrt{a^2 + b^2 + c^2} \quad (7)$$

Finally, the probabilities of different symbols for the non-empty-child cell configurations are set. The obtained probability model is applied to the entropy coding of the actual non-empty-child cell configuration.

Figure 8:
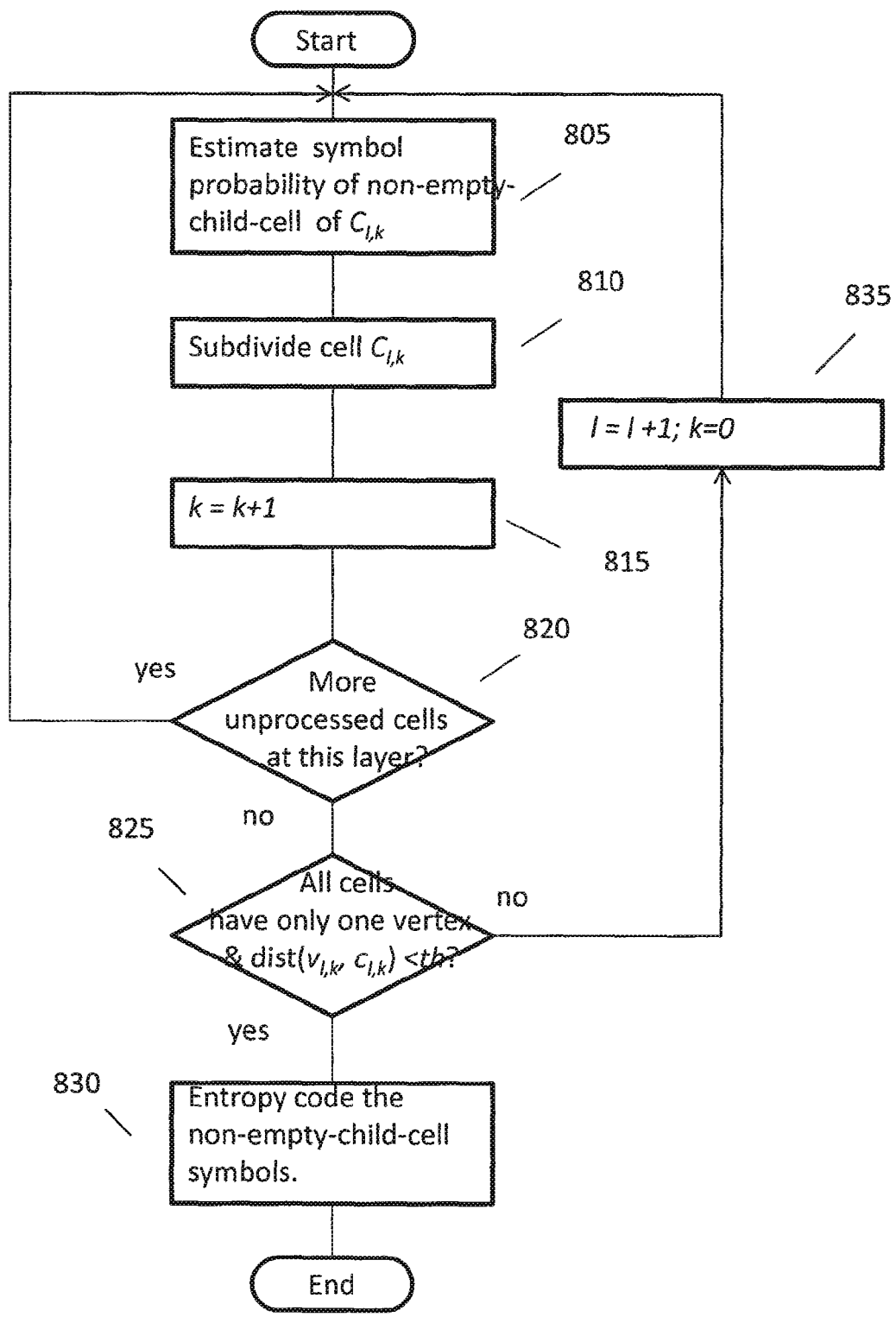
FIG. 8 is a flowchart of an exemplary embodiment of the predictive position coding method of the present invention in accordance with the principles of the present invention.

FIG. 8 is a flowchart of an exemplary embodiment of the predictive position coding method of the present invention in accordance with the principles of the present invention. Initialize a cell counter. At 805 the prediction of non-empty-child-cell configuration of $C_{l,k}$ is calculated, where $C_{l,k}$ denotes the $k^{th}$ cell at layer l. At 810 cell $C_{l,k}$ is subdivided again. At 815 the cell counter (k) is incremented. At 820 a test is performed to determine if there are more unprocessed calls in the present layer. If there are more unprocessed cells then processing proceeds to 805. If there are no more unprocessed cells then at 825 a test is performed by the entropy encoder to determine if all non-empty-child-cells at the deepest layer contain at most one point (vertex) and that the distance between the center of the sub-cell and the point inside the sub-cell $v_{l,k}$ is less than or equal to the maximum error allowed, where the maximum error allowed is th and where $c_{l,k}$ is the central point of $C_{l,k}$. If all cells at the deepest layer contain at most one point (vertex) and that the distance between the center of the sub-cell and the point inside the sub-cell $v_{l,k}$ is less than or equal to the maximum error allowed then at 830 the non-empty-child-cell symbols are encoded. If all cells at the deepest layer either do not contain at most one point (vertex) or the distance between the center of the sub-cell and the point inside the sub-cell $v_{l,k}$ is greater than the maximum error allowed, then at 835 cell counter (k) is reinitialized and the layer counter (l) is incremented. Processing then proceeds to 805. Steps 805, 810, 815, 820 and 835 are essentially the plane fitting described above, Step 825 is the plane fitting accuracy described above and step 830 includes the steps of setting the probability and applying entropy coding to the obtained probabilities.

Figure 8A:
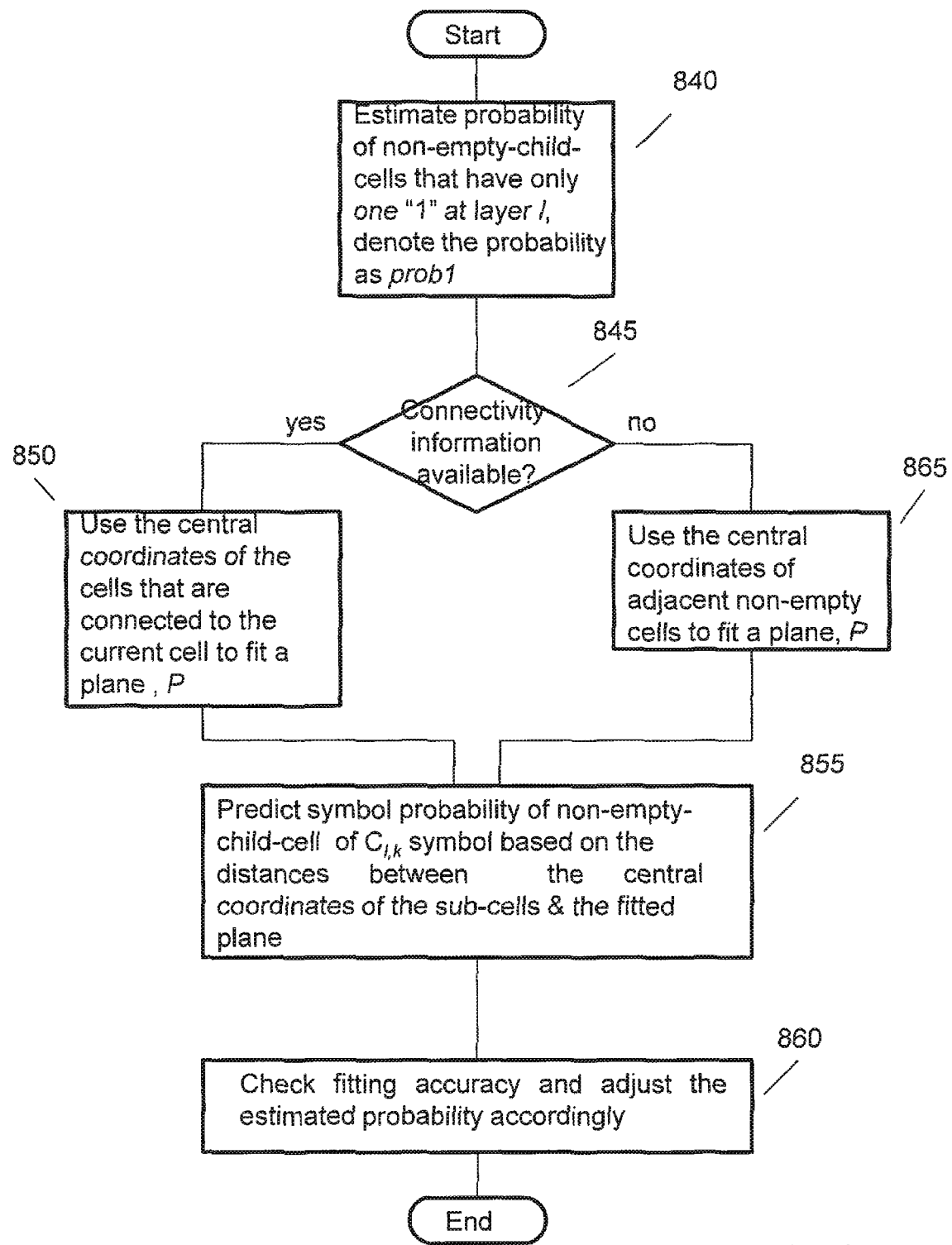
FIG. 8A is an exploded view of step 805 of FIG. 8.

FIG. 8A is an exploded view of step 805 of FIG. 8. At 840 the probability of non-empty-child-cells that have only a single "1" at layer l, denote the probability as prob1. At 845 a test is performed to determine if connectivity information is available. If connectivity is available then at 850, the central coordinates of the cells that are connected to the current cell are used to fit plane P. At 855 the symbol probability of non-empty-child cell $C_{l,k}$ is predicted based on the distances between the central coordinates of the sub-cells and the fitted plane. The probability of non-empty-child-cells that have only a single "1", (e.g., 10000000, 01000000 . . . ) are multiplied by prob1. The probabilities of the non-empty-child-cells that have multiple "1"s (e.g., 11000000, 01000100 . . . ) are multiplied by (1-prob1). At 860 the fitting accuracy is checked and the estimated probability is adjusted accordingly. If the fitting error is small (accuracy is high), predicted symbol probability is unadjusted. If the fitting error is large (accuracy is low), the predicted symbol probability is set closer to a uniform distribution. If connectivity information is not available, then at 865 the central coordinates of adjacent non-empty cells are used to fit a plane P.

The decoding process is essentially the reverse of the encoding process. The encoded symbols are received at the theater or consumer device and decoded one at a time layer by layer based on the predicted probability until all symbols have been decoded. The encoded symbols may be stored in a storage means prior to or after processing. Once the symbols have been decoded the 3D mesh model is regenerated for rendering on a consumer device or at a theater. The regenerated 3D mesh model may be stored in a storage means prior to rendering.

Figure 9:
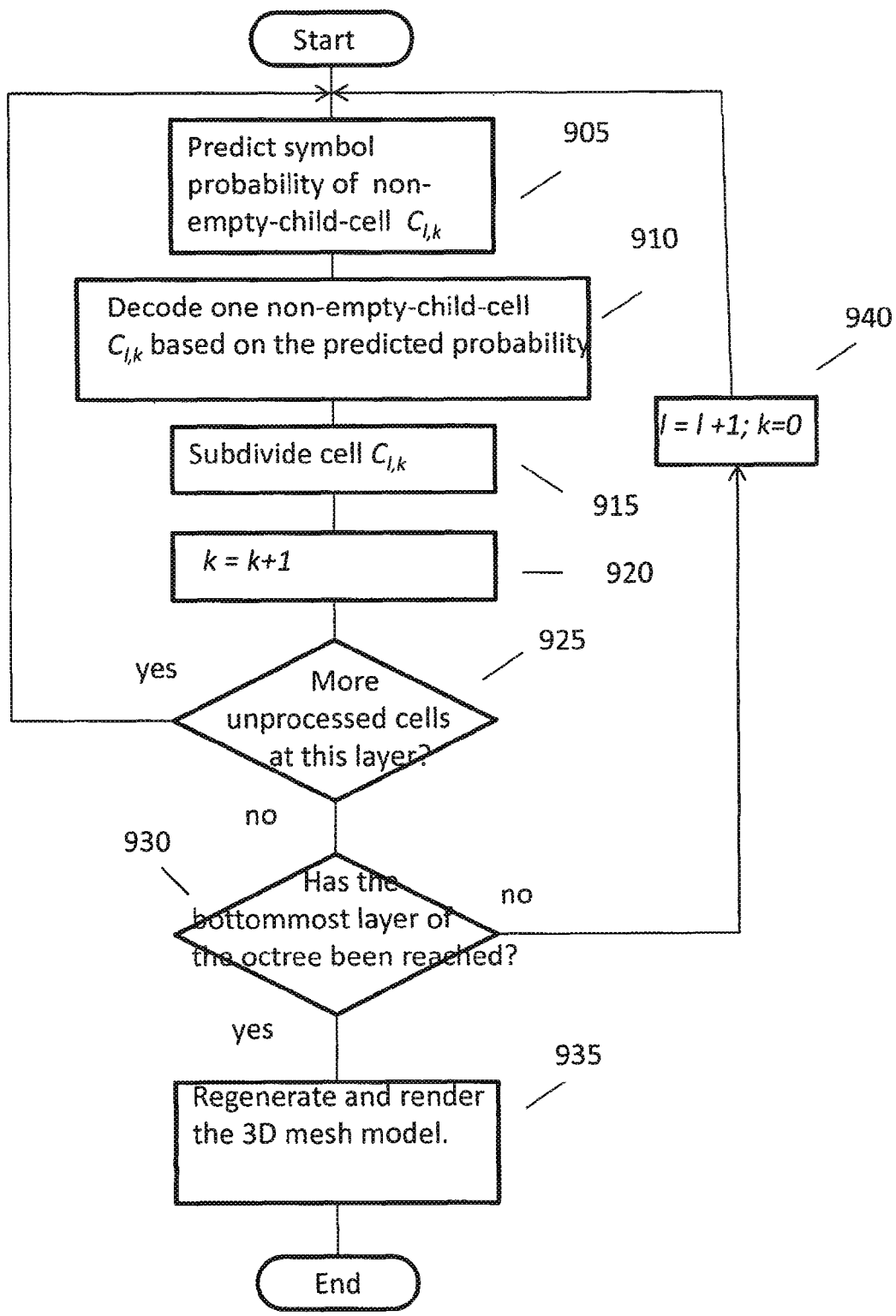
FIG. 9 is a flowchart of an exemplary embodiment of the predictive position decoding method of the present invention in accordance with the principles of the present invention.

FIG. 9 is a flowchart of an exemplary embodiment of the predictive position decoding method of the present invention in accordance with the principles of the present invention. Initialize a cell counter. At 905, an encoded symbol is predicted at a receiving device. The encoded symbol may be stored in a storage means prior to or after processing. The received (encoded) symbol of non-empty-child-cell configuration $C_{l,k}$ is decoded based on the on the predicted probability at 910. Cell $C_{l,k}$ is subdivided according to the decoded configuration at 915. At 920, the cell counter (k) is incremented. At 925 a test is performed to determine if there are more unprocessed cells in this layer. If there are more unprocessed cells in this layer, then processing proceeds to 905. If there are no more unprocessed cells in this layer then at 930 a test is performed to determine if the bottommost the octree has been received. If the bottommost the octree has been received then at 935 the 3D mesh model is regenerated for rendering. The regenerated 3D mesh model may be stored in a storage means prior to rendering. If the bottommost the octree has not been received then at 940 the layer counter (l) is incremented and the cell counter (k) is reinitialized. Processing proceeds to 905.

Figure 9A:
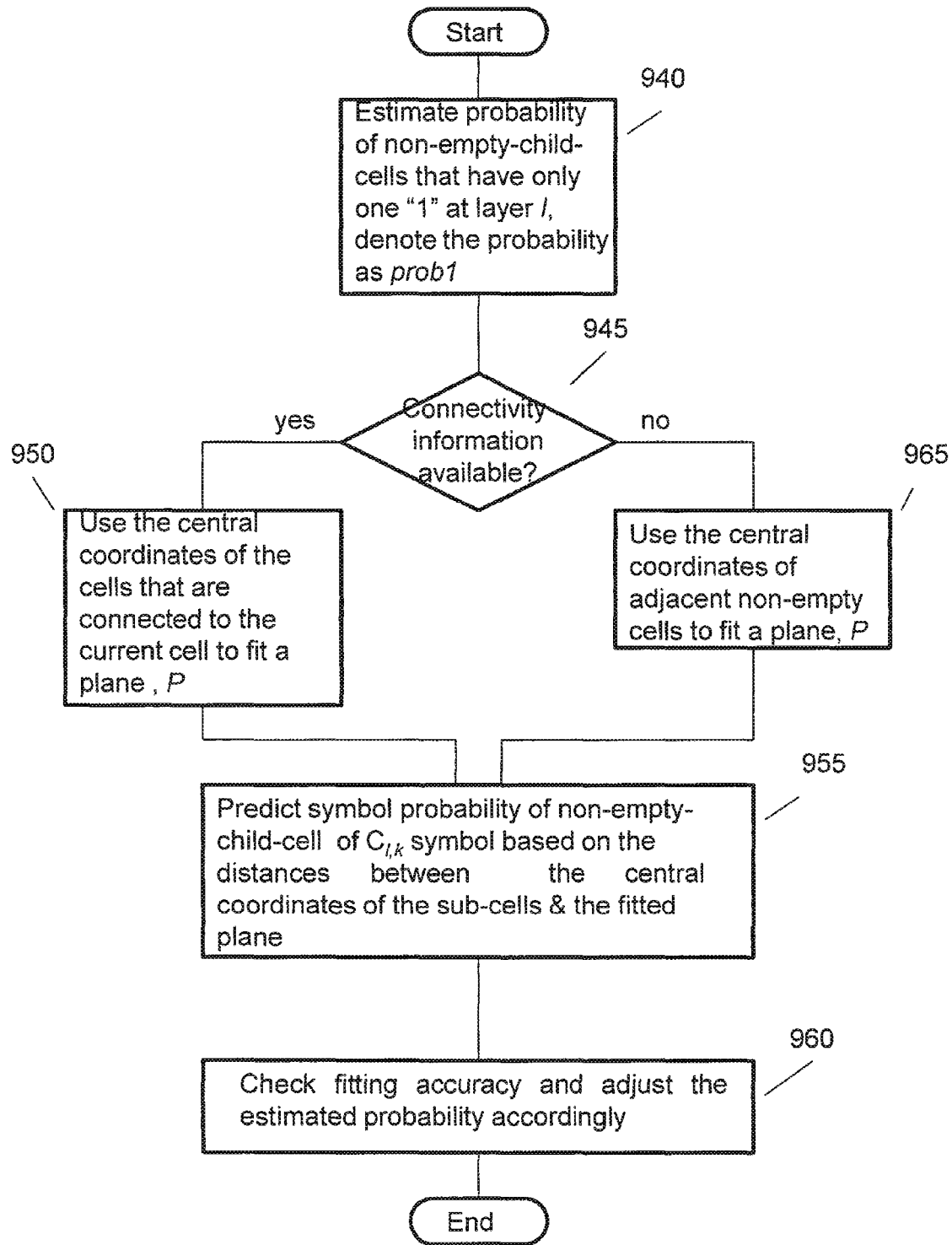
FIG. 9A is an exploded view of step 905 of FIG. 9.

FIG. 9A is an exploded view of step 905 of FIG. 9. At 940 the probability of non-empty-child-cells that have only a single "1" at layer l, denote the probability as prob1. At 945 a test is performed to determine if connectivity information is available. If connectivity is available then at 950, the central coordinates of the cells that are connected to the current cell are used to fit plane P. At 955 the symbol probability of non-empty-child cell $C_{l,k}$ is predicted based on the distances between the central coordinates of the sub-cells and the fitted plane. The probability of non-empty-child-cells that have only a single "1", (e.g., 10000000, 01000000 . . . ) are multiplied by prob1. The probabilities of the non-empty-child-cells that have multiple "1"s (e.g., 11000000, 01000100 . . . ) are multiplied by (1-prob1). At 960 the fitting accuracy is checked and the estimated probability is adjusted accordingly. If the fitting error is small (accuracy is high), predicted symbol probability is unadjusted. If the fitting error is large (accuracy is low), the predicted symbol probability is set closer to a uniform distribution. If connectivity information is not available, then at 965 the central coordinates of adjacent non-empty cells are used to fit a plane P.

Figure 10:
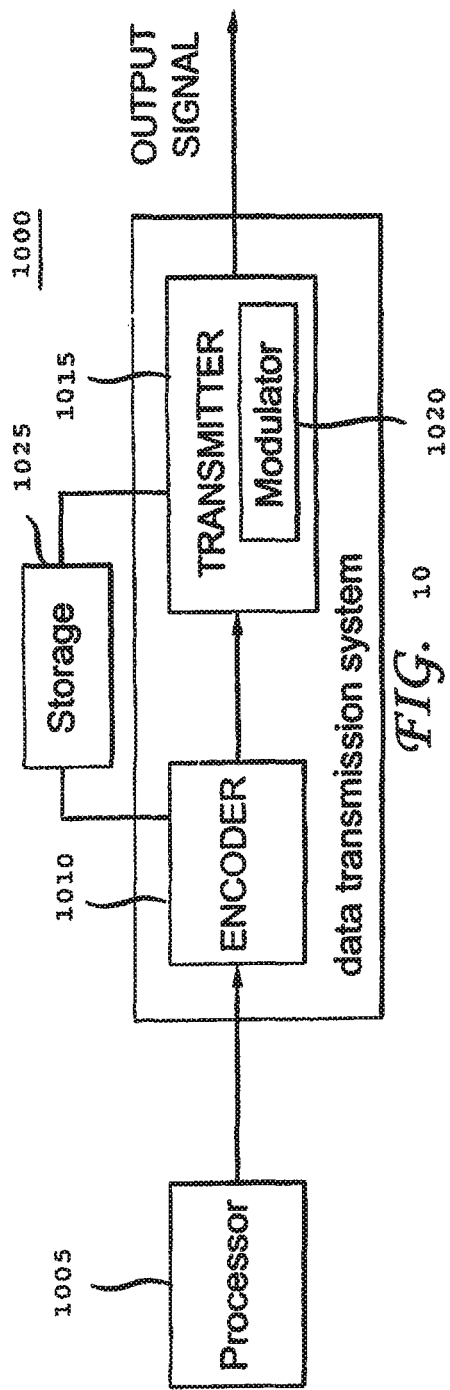
FIG. 10 is a block diagram of an exemplary embodiment of a device including predictive position coding in accordance with the principles of the present invention.

FIG. 10 is a block diagram of an exemplary embodiment of a device including predictive position coding in accordance with the principles of the present invention. Referring now to FIG. 10, a data transmission system or apparatus 1000 is shown, to which the features and principles described above may be applied. The data transmission system or apparatus 1000 may be, for example, a head-end or transmission system for transmitting a signal using any of a variety of media, such as, for example, satellite, cable, telephone-line, or terrestrial broadcast. The data transmission system or apparatus 1000 also, or alternatively, may be used, for example, to provide a signal for storage. The transmission may be provided over the Internet or some other network. The data transmission system or apparatus 1000 is capable of generating and delivering, for example, video content and other content such as, for example, 3D mesh models.

The data transmission system or apparatus 1000 receives processed data and other information from a processor 1005. In one implementation, the processor 1005 processes geometry data of 3D mesh models to generate sequences of symbols. The processor 1005 may also provide metadata to 1000 indicating, for example, how an octree tree data structure is divided into parts and other information.

The data transmission system or apparatus 1000 includes an encoder 1010 and a transmitter 1015 capable of transmitting the encoded signal. The encoder 1010 receives data information from the processor 1005. The encoder 1010 generates an encoded signal(s). The entropy encoding engine of encoder 1010 may be, for example, an arithmetic coder or Huffman coder.

The encoder 1010 may include sub-modules, including for example an assembly unit for receiving and assembling various pieces of information into a structured format for storage or transmission. The various pieces of information may include, for example, coded or uncoded video, and coded or uncoded elements such as, for example, substream length indicator, and syntax elements. In some implementations, the encoder 1010 includes the processor 1005 and therefore performs the operations of the processor 1005. Encoder 1010 operates in accordance with the principles described above with respect to FIGS. 8 and 8A.

The transmitter 1015 receives the encoded signal(s) from the encoder 1010 and transmits the encoded signal(s) in one or more output signals. The transmitter 1015 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1020. The transmitter 1015 may include, or interface with, an antenna (not shown). Further, implementations of the transmitter 1015 may be limited to the modulator 1020.

The data transmission system or apparatus 1000 is also communicatively coupled to a storage unit 1025. In one implementation, the storage unit 1025 is coupled to the encoder 1010, and stores an encoded bitstream from the encoder 1010. In another implementation, the storage unit 1025 is coupled to the transmitter 1015, and stores a bitstream from the transmitter 1015. The bitstream from the transmitter 1015 may include, for example, one or more encoded bitstreams that have been further processed by the transmitter 1015. The storage unit 1025 is, in different implementations, one or more of a standard DVD, a Blu-Ray disc, a hard drive, or some other equivalent storage device.

Figure 11:
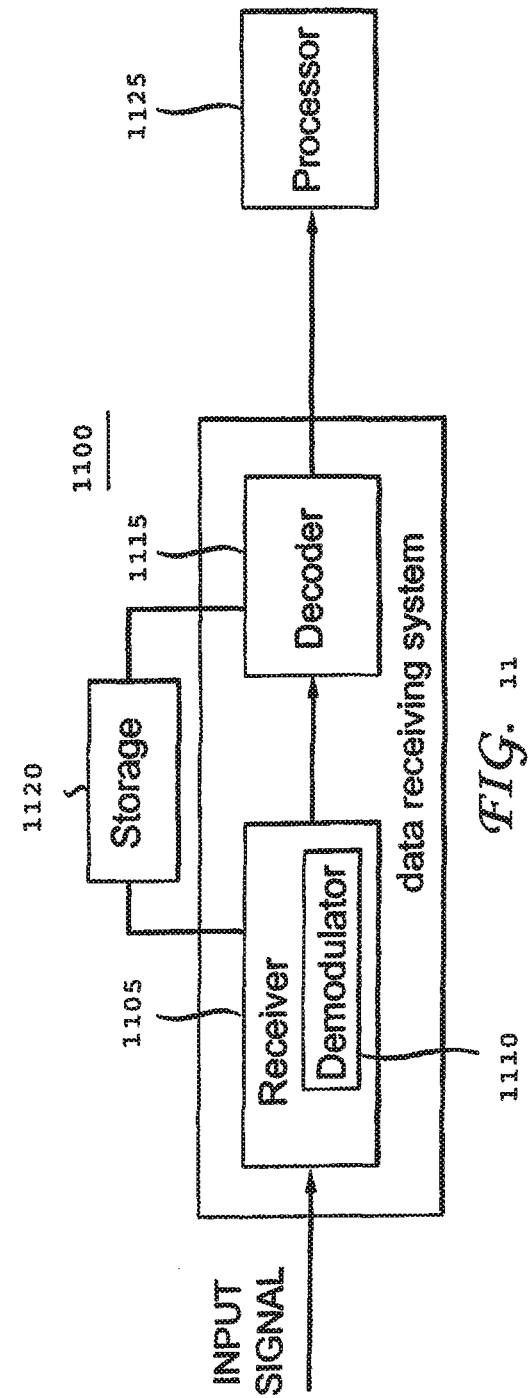
FIG. 11 is a block diagram of an exemplary embodiment of a device including predictive position decoding in accordance with the principles of the present invention.

FIG. 11 is a block diagram of an exemplary embodiment of a device including predictive position decoding in accordance with the principles of the present invention. Referring now to FIG. 11, a data receiving system or apparatus 1100 is shown to which the features and principles described above may be applied. The data receiving system or apparatus 1100 may be configured to receive signals over a variety of media, such as, for example, storage device, satellite, cable, telephone-line, or terrestrial broadcast. The signals may be received over the Internet or some other network.

The data receiving system or apparatus 1100 may be, for example, a cell-phone, a computer, a set-top box, a television, or other device that receives encoded video and provides, for example, decoded video signal for display (display to a user, for example), for processing, or for storage. Data receiving apparatus 1100 may also be equipment in a theater that is receiving the signals for rendering for a theater audience. Thus, the data receiving system or apparatus 1100 may provide its output to, for example, a screen of a television, a computer monitor, a computer (for storage, processing, or display), or some other equivalent storage, processing, or display device.

The data receiving system or apparatus 1100 is capable of receiving and processing data information, where the data information may include, for example, 3D mesh models. The data receiving system or apparatus 1100 includes a receiver 1105 for receiving an encoded signal, such as, for example, the signals described in the implementations of this application. The receiver 1105 may receive, for example, a signal providing one or more of the 3D mesh models and/or texture images, or a signal output from the data transmission system 1000 of FIG. 10.

The receiver 1105 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1110, de-randomizing the energy in the signal, de-interleaving the data in the signal, and error-correction decoding the signal. The receiver 1105 may include, or interface with, an antenna (not shown). Implementations of the receiver 1105 may be limited to the demodulator 1110.

The data receiving system or apparatus 1100 includes a decoder 1115. The receiver 1105 provides a received signal to the decoder 1115. The signal provided to the decoder 1115 by the receiver 1105 may include one or more encoded bitstreams. The decoder 1115 outputs a decoded signal, such as, for example, decoded video signals including video information. Decoder 1115 operates in accordance with the principles described above with respect to FIGS. 9 and 9A.

The data receiving system or apparatus 1100 is also communicatively coupled to a storage unit 1120. In one implementation, the storage unit 1120 is coupled to the receiver 1105, and the receiver 1105 accesses a bitstream from the storage unit 1120. In another implementation, the storage unit 1120 is coupled to the decoder 1115, and the decoder 1115 accesses a bitstream from the storage unit 1120. The bitstream accessed from the storage unit 1120 includes, in different implementations, one or more encoded bitstreams. The storage unit 1120 is, in different implementations, one or more of a standard DVD, a Blu-Ray disc, a hard drive, or some other equivalent storage device.

The output data from the decoder 1115 is provided, in one implementation, to a processor 1125. The processor 1125 is, in one implementation, a processor configured for performing 3D mesh model reconstruction. In some implementations, the decoder 1115 includes the processor 1125 and therefore performs the operations of the processor 1125. In other implementations, the processor 1125 is part of a downstream device such as, for example, a set-top box or a television or other equipment (device, apparatus 1100 at a movie theater.

One or more implementations are provided having particular features and aspects. In particular, several implementations relating to entropy encoding and decoding are provided. Predictive position entropy encoding and decoding may allow a variety of applications, such as, for example, compression of geometry data of a 3D mesh, random 2D coordinates, and any data source with varying statistics. However, variations of these implementations and additional applications are contemplated and within the present application, and features and aspects of described implementations may be adapted for other implementations.

Several of the implementations and features described in this application may be used in the context of the MPEG 3DGC Standard and its extensions. Additionally, these implementations and features may be used in the context of another standard (existing or future), or in a context that does not involve a standard.

Additionally, this application or its claims may refer to "determining" various pieces of information. Determining the information may include one or more of, for example, estimating the information, calculating the information, predicting the information, or retrieving the information from memory.

Additionally, many implementations may be implemented in one or more of an encoder (for example, the encoder 1010), a decoder (for example, the decoder 1115), a post-processor (for example, the processor 1125) processing output from a decoder, or a pre-processor (for example, the processor 1005) providing input to an encoder. Further, other implementations are contemplated by this disclosure.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for position coding of three dimensional mesh models, said method comprising:
estimating a symbol probability of a non-empty-child-cell $C_{l,k}$, where $C_{l,k}$ denotes the $k^{th}$ cell at layer l, wherein the symbol probability is estimated based on an accuracy of a fitted plane P;
sub-dividing said non-empty-child-cell to produce a sub-cell, if said non-empty-child-cell has more than one vertex;
determining if there are more unprocessed non-empty-child-cells at layer l;
if there are no more unprocessed non-empty-child-cells at layer l, determining if all non-empty-child-cells at layer l have only one vertex and a distance between the center of the sub-cell and a point inside the sub-cell is less than or equal to a first threshold; and
entropy coding symbols representing a position of said non-empty-child-cells, if all non-empty-child-cells at layer l have only one vertex and the distance between the center of the sub-cell and the point inside the sub-cell is less than or equal to the first threshold.

2. The method according to claim 1, wherein said first threshold is a maximum error.

3. The method according to claim 1, wherein the sub-cells of a given layer become the cells of a next deeper layer.

4. The method according to claim 1, wherein the symbol probability is estimated for said non-empty-child-cell having a single "1" at layer l, wherein said single "1" indicates said non-empty-child-cell contains at least one vertex.

5. The method according to claim 4, further comprising predicting symbol probability of said non-empty-child-cell $C_{l,k}$ responsive to the surface area of the convex hull which is formed by current non-empty-child-cell central coordinates and central coordinates of cells connected to a current non-empty-child-cell.

6. The method according to claim 3, further comprising predicting symbol probability of said non-empty-child-cell $C_{l,k}$ responsive to the surface area of the convex hull which is formed by current non-empty-child-cell central coordinates and central coordinates of cells connected to a current non-empty-child-cell.

7. The method according to claim 4, wherein central coordinates of cells connected to a current non-empty-child-cell are used to generate said fitted plane P, if connectivity information is available.

8. The method according to claim 7, further comprising:
predicting symbol probability of said non-empty-child-cell $C_{l,k}$ responsive to distances between central coordinates of sub-cells and said fitted plane P;
checking a fitting error of said fitted plane P; and
adjusting said estimated symbol probability.

9. The method according to claim 8, wherein if said fitting error is smaller than a second threshold, the predicted symbol probability is unadjusted.

10. The method according to claim 8, wherein if said fitting error is larger than a second threshold, the predicted symbol probability is set closer to a uniform distribution.

11. The method according to claim 8, wherein the fitting error is used as a parameter for a function to calculate symbol probability of non-empty-child-cell configurations such that the estimated symbol probability of non-empty-child-cell approaches a uniform distribution as said parameter increases.

12. The method according to claim 4, wherein central coordinates of adjacent non-empty cells are used to generate said fitted plane P, if connectivity information is not available.

13. The method according to claim 12, further comprising:
predicting symbol probability of, said non-empty-child-cell $C_{l,k}$ responsive to distances between central coordinates of sub-cells and said fitted plane P;
checking a fitting error of said fitted plane P; and
adjusting said estimated symbol probability.

14. The method according to claim 13, wherein if said fitting error is smaller than a second threshold, the predicted symbol probability is unadjusted.

15. The method according to claim 13, wherein if said fitting error is larger than a second threshold, the predicted symbol probability is set closer to a uniform distribution.

16. The method according to claim 12, wherein the fitting error is used as a parameter for a function to calculate symbol probability of non-empty-child-cell configurations such that the estimated symbol probability of non-empty-child-cell approaches a uniform distribution as said parameter increases.

17. The method according to claim 1, wherein the symbol probability is estimated for said non-empty-child-cell having multiple "1"s at layer l.

18. The method according to claim 17, wherein weights are assigned to each vertex, wherein the weights are rescaled if the weights are too large and the estimated probability is normalized by a corresponding weight.

19. An apparatus or position coding of three dimensional mesh models comprising:
a processor configured to receive data;
an encoder configured to generate an encoded signal, said encoder being configured to:
estimate a symbol probability of a non-empty-child-cell $C_{l,k}$, where $C_{l,k}$ denotes the $k^{th}$ cell at layer l, wherein the symbol probability is estimated based on an accuracy of a fitted plane P,
sub-divide said non-empty-child-cell to produce a sub-cell, if said non-empty-child-cell has more than one vertex,
determine if there are more unprocessed non-empty-child-cells at layer l,
if there are no more unprocessed non-empty-child-cells at layer l, determine if all non-empty-child-cells at layer l have only one vertex and a distance between the center of the sub-cell and a point inside the sub-cell is less than or equal to a threshold, and
entropy code symbols representing a position of said non-empty-child-cells, if all non-empty-child-cells at layer l have only one vertex and the distance between the center of the sub-cell and the point inside the sub-cell is less than or equal to the threshold.

20. The apparatus according to claim 19, wherein the symbol probability is estimated for said non-empty-child-cell having a single "1" at layer l, wherein said single "1" indicates said non-empty-child-cell contains at least one vertex, wherein central coordinates of cells connected to a current non-empty-child-cell are used to generate said fitted plane P, if connectivity information is available, and wherein said encoder is further configured to further:
predict symbol probability of said non-empty-child-cell $C_{l,k}$ responsive to distances between central coordinates of sub-cells and said fitted plane P;
check a fitting error of said fitted plane P; and
adjust said es mated symbol probability.

21. The apparatus according to claim 19, wherein the symbol probability is estimated for said non-empty-child-cell having a single "1" at layer l, wherein central coordinates of adjacent non-empty cells are used to generate said fitted plane P, if connectivity information is not available, and wherein said encoder is further configured to:
predict symbol probability of said non-empty-child-cell $C_{l,k}$ responsive to distances between central coordinates of sub-cells and said fitted plane P;
check a fitting error of said fitted plane P; and
adjust said estimated symbol probability.

22. The apparatus according to claim 19, wherein the symbol probability is estimated for said non-empty-child-cell having multiple "1"s at layer l, wherein weights are assigned to each vertex, wherein the weights are resealed if the weights are too large and the estimated probability is normalized by a corresponding weight.

* * * * *